Figure 1:
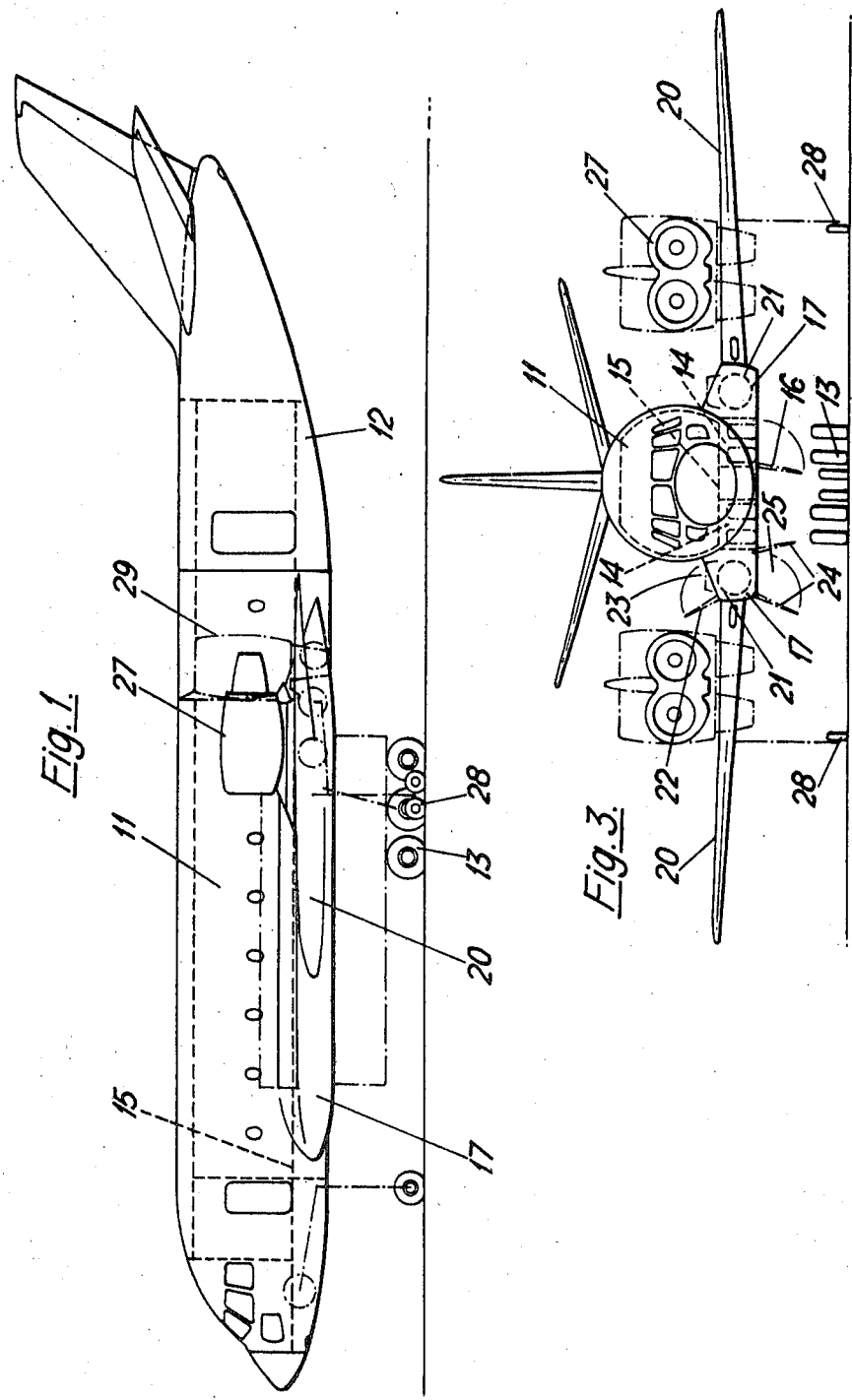

United States Patent

[11] 3,599,900

[72] Inventor Tadeusz Karol Szlenkier
 Hatfield, England
[21] Appl. No. 806,466
[22] Filed Mar. 12, 1969
[45] Patented Aug. 17, 1971
[73] Assignee Hawker Siddeley Aviation Limited
 Surrey, England
[32] Priority Mar. 15, 1968
[33] Great Britain
[31] 12831/68

[54] AIRCRAFT
 7 Claims, 6 Drawing Figs.
[52] U.S. Cl. .................................................. 244/12
[51] Int. Cl. .................................................. B64c 29/00
[50] Field of Search .......................................... 244/46, 12

[56] References Cited
UNITED STATES PATENTS
2,945,641 7/1960 Pribram ........................ 244/12
3,018,985 1/1962 Voigt ........................... 244/46
3,099,423 7/1963 Wilde et al. .................... 244/12
3,110,456 11/1963 Creasey et al. ................. 244/12
3,383,075 5/1968 Chichester-Miles ............. 244/12
3,000,594 9/1961 Madelung ...................... 244/12
3,292,368 12/1966 Taylor ......................... 244/12
3,429,527 2/1969 Whittley ....................... 244/12

Primary Examiner—Milton Buchler
Assistant Examiner—Steven W. Weinrieb
Attorney—Dowell & Dowell ABSTRACT: A civil aircraft with a short takeoff and landing capability derived from the provision of a multiplicity of direct jet lift engines mounted in sponson pods along each side of the fuselage. The wings are united to the fuselage through these sponson pods which each comprise a cellular structure of spars designed both for transmitting and lift loads and to accommodate the lift engines.

PATENTED AUG 17 1971

3,599,900

SHEET 1 OF 4

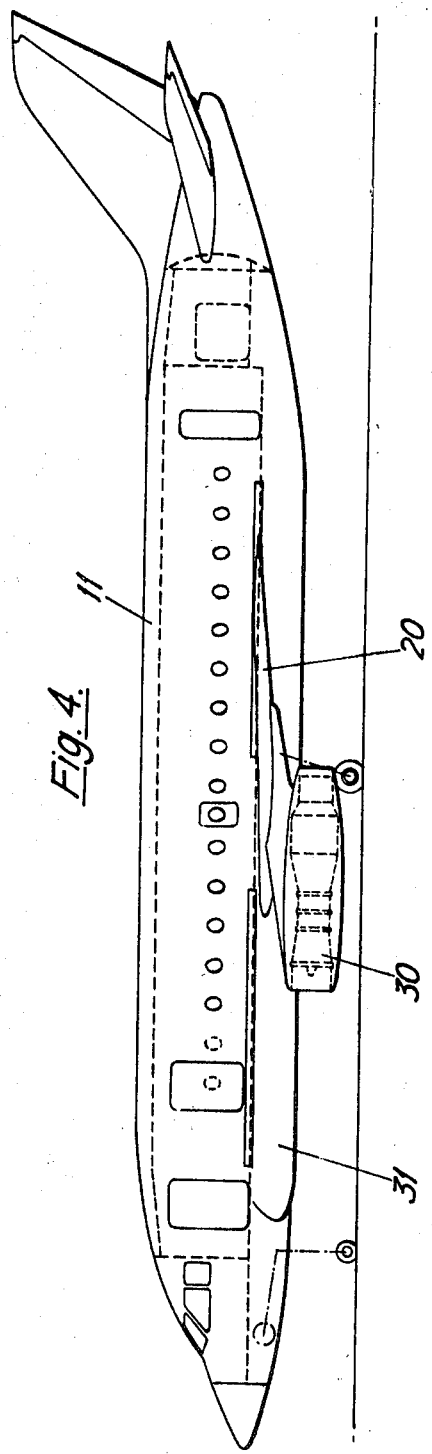
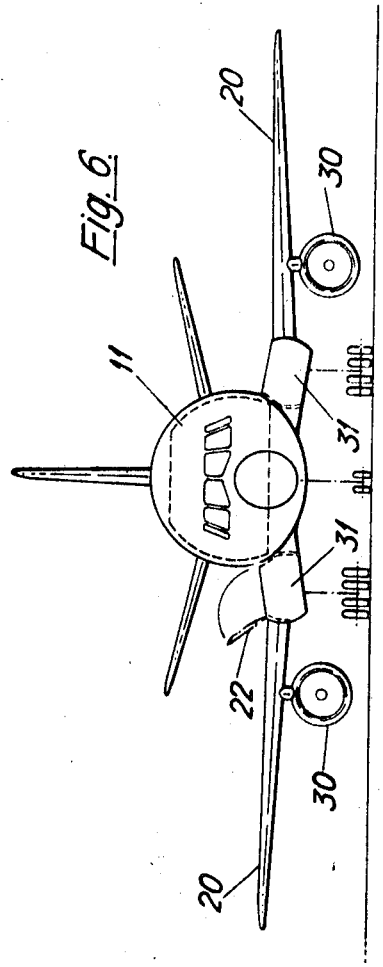

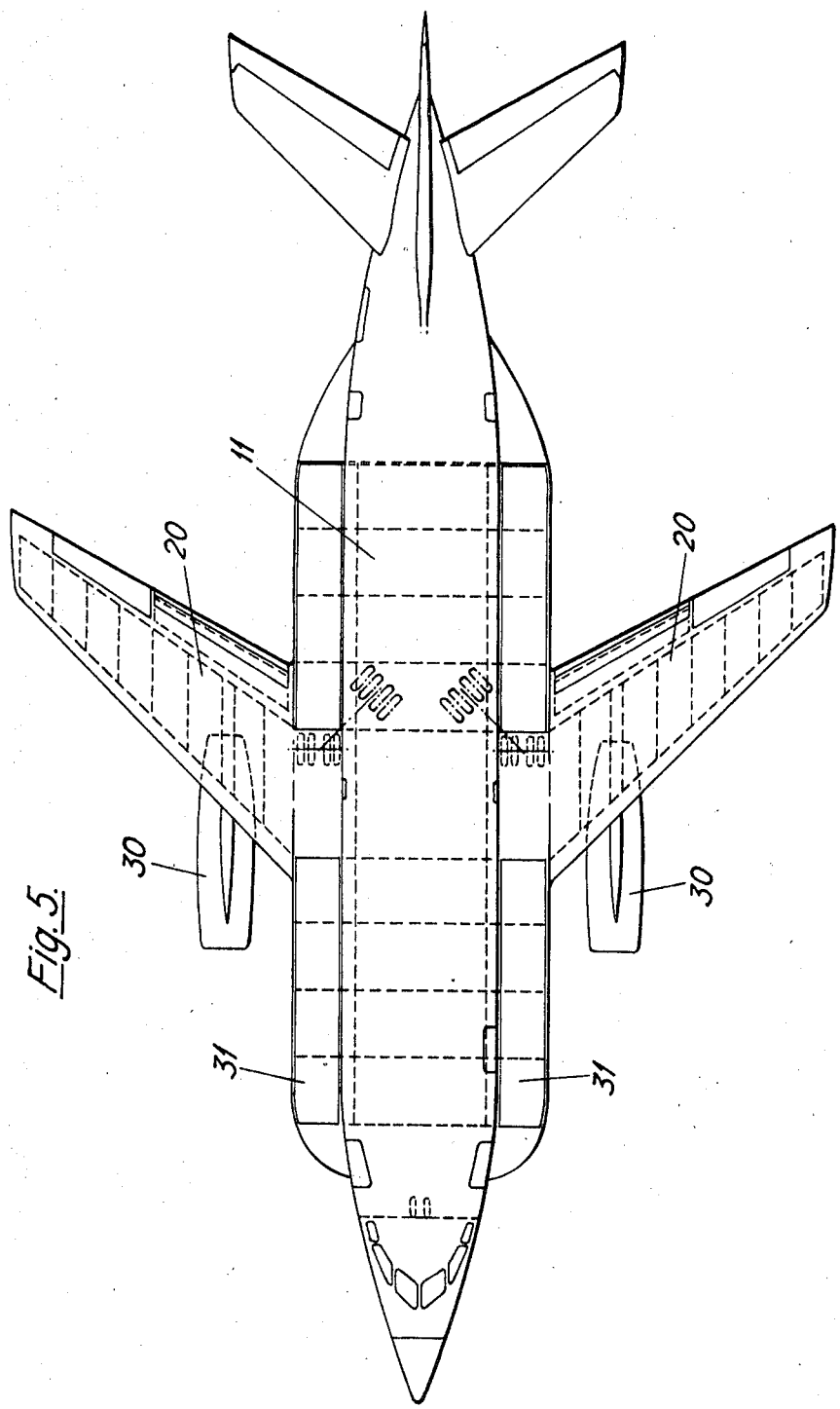

AIRCRAFT

This invention is concerned with aircraft having a vertical or short takeoff and landing capability.

In order to develop lift by means of an airfoil it is necessary to move it relatively to the air which surrounds it. With conventional airplanes this implies that the aircraft will have to have some forward speed before it can takeoff. There are limitations on the range between the maximum and minimum speed at which an airplane can fly, with the result that a high speed airplane will takeoff and land at some considerable forward speed with all the known consequences upon the requirements for runway length and potential danger involved in making takeoffs and landings.

A conventional airplane can be adapted to produce an abnormally high lift at comparatively low forward speeds. Such an airplane then becomes known as an STOL type, although the basic principle of the method of obtaining the lift remains unaltered.

Instead of constructing the airfoil in the form of a fixed wing which moves through the air as one with the airplane, it is also possible to obtain lift by employing a rotating airfoil. Such an airplane is basically a helicopter. Its ability to takeoff, land and remain in the air is independent of its forward speed, but there are severe limitations on the maximum speed at which a helicopter can fly. If the airplane is also equipped with conventional fixed wings, there are two ways in which these limitations could be overcome. One can either arrange to fold the rotating airfoils once the airplane is in the air and obtained sufficient forward speed, or one can reduce the size of the rotating airfoil assembly and house it wholly or at least substantially within the wing or fuselage, or perhaps in pods attached to the wings. In that case, upon reaching a sufficient forward speed, one can merely stop the rotating assembly. One can now use a rotating assembly in the form of a power-driven fan, a bypass-type gas turbine engine, or a simple jet engine. In some proposals the same rotating assembly is used either for lift or forward propulsion, as for example tilting propellers, tilting wings complete with engines and propellers or vectored thrust jet engines.

There are a great many technical difficulties to overcome in the achievement of a satisfactory arrangement of airplane within the general range of possibilities just described. In spite of the fact that the broad picture has been general knowledge for a good many years there is, at this time, apart from a few experimental prototypes, only one aircraft which is in full production; that is a single engined high speed aircraft which is being produced in quantity for military use. Detail studies of many other proposed solutions have clearly indicated that it is not sufficient merely to choose a type and then to apply the best knowledge available within the state of the art. In every case some unacceptable limitations on the probable performance have manifested themselves even at the stage of theoretical consideration. A satisfactory solution will depend upon a choice of configuration of the aircraft which makes it possible to minimize the known drawbacks to a sufficient degree.

The present proposal represents such a solution. Whereas it is possible to house the lift-producing rotating assembly in the fuselage of a small military aircraft this, in practice, cannot be done with a transport aircraft, regardless of whether this is designed for civil or military use. The space in the fuselage is required for the carrying of cargo, and even if the lift engines or fans could be housed beneath the fuselage floor it would be difficult, if not impossible, to provide effective entry and exit channels. Consequently, it is usual to have lift engines or fans housed either in the wing itself or in pods attached to the wing. Both of these methods have certain disadvantages which become particularly apparent if one excludes from the range of suitable lift-producing devices a simple lift jet engine. On the other hand, if one chooses the simple lift jet engine one runs into the difficulties that they are excessively noisy in operation and may damage the ground at takeoff, both by the action of the heat and erosion.

In order to reduce the temperature and speed of the lift-producing jet it is necessary to employ either a high intensity jet mixing system with a plain jet, high ratio bypass engines or power-driven fans. Any of these devices require more space than a plain jet lift engine and they are not quite so suitable for incorporation in discrete pods. There might be sufficient space within the wing for such devices but the size and number of necessary openings required in the wing structure make it impractical to employ a wing of conventional form as the necessary reinforcement in the remaining structure would lead to an unacceptable weight penalty. It has, consequently, been proposed (British Pat. Spec. No. 1,101,262) to house such lift devices in what is known as a narrow delta wing. While this is a promising development it is recognized that the narrow delta type of wing has primarily been developed for supersonic speeds and may, in fact, not be the most suitable form of wing for a vertical takeoff aircraft. The present proposal is designed to overcome this limitation.

According to the present invention, power units providing direct lifting thrust are housed on either side of the fuselage, immediately adjacent to it, in multicellular structures connecting the wings with the fuselage. The form of these structures is designed such that they are equally suitable for transmitting the necessary lift loads as well as housing the required number of lifting units. Each such structure may be referred to as a sponson pod.

Furthermore, it is possible to position the lifting units in these structures in the proper location forward and aft of the center of gravity of the aircraft. By virtue of locating the lift units close to each side of the fuselage advantage may be taken of the fuselage side itself to provide, in conjunction with opening doors, a suitable intake channel for the lift engines. Doors beneath the lifting unit, possibly in conjunction with the undercarriage bay doors, can provide exit channels of sufficient length to become effective for the purpose of a high intensity mixing system to achieve thrust augmentation and noise reduction by virtue of reduced temperature and velocity.

Figure 2:
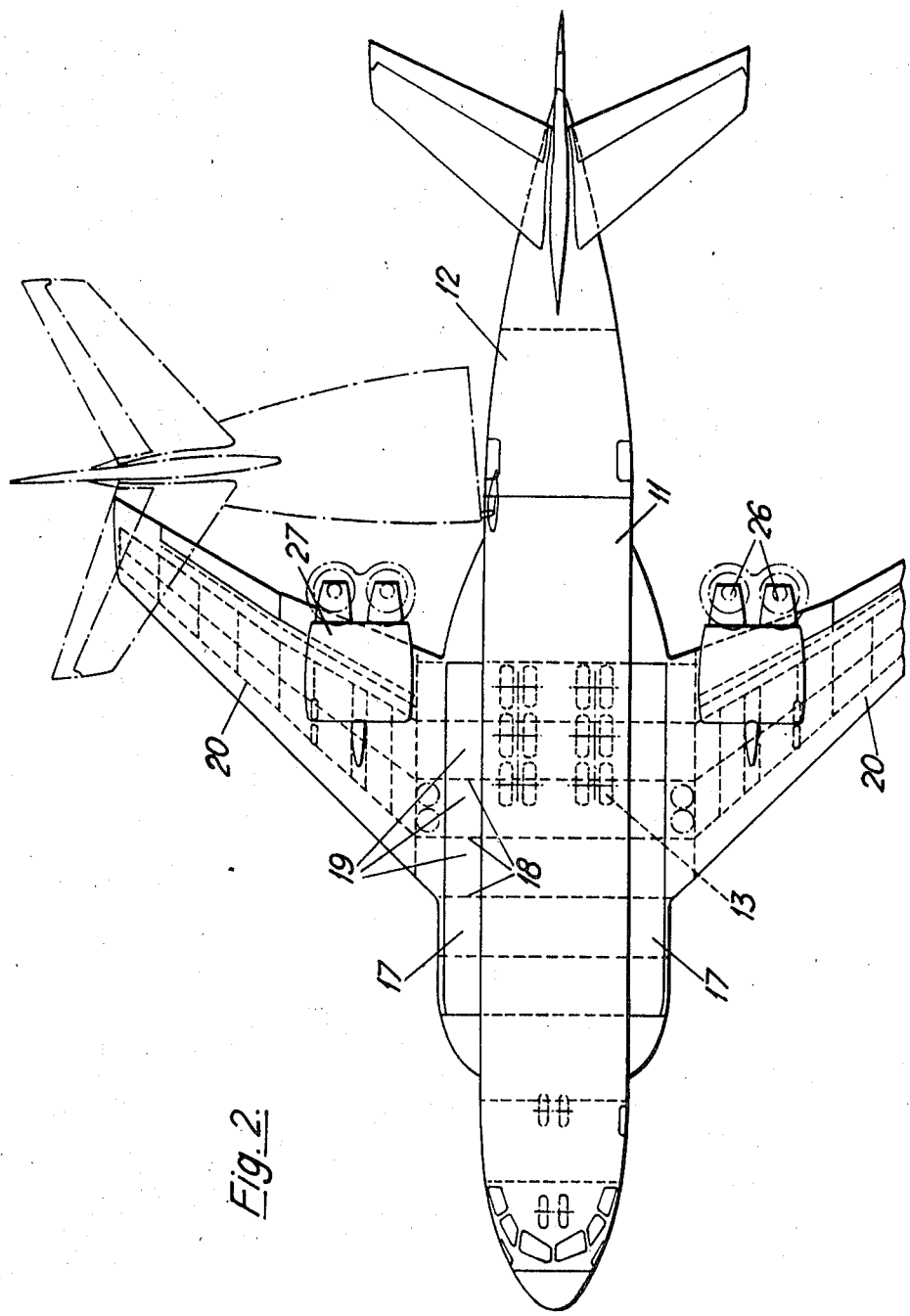

Forms of construction in accordance with the invention will now be described by way of example with reference to the accompanying drawings, in which:

FIGS. 1, 2 and 3 show a first aircraft design in side elevation, plan and front elevation, respectively, and FIGS. 4, 5 and 6 are corresponding views of a second aircraft design.

FIGS. 1 to 3 of the drawings show a transport aircraft of which the fuselage 11 has a hinged rear section 12 for the purpose of loading and unloading. The main undercarriage comprises six pairs of wheels, 13, directly under the fuselage which retract into bays 14 beneath the cargo floor 15.

To provide lateral stability, the main undercarriage is augmented by outrigger wheels 28 retracting into the wings. The undercarriage bays 14 for the main undercarriage are closed by doors 16 which hinge about fore and aft hinge axes. Immediately outboard of the undercarriage bays there are located alongside the lower fuselage cellular sponson structures 17 whereby the wings 20 are united to the fuselage. These structures 17 comprise a series of fuselage frame extensions and spars 18, a rearward group of which are continued outward to form the spars of the wings. Between the spars 18 within each of the structures 17 are a series of six cells 19 that house a row of six gas turbojet lift engines 21 mounted with their axes vertical.

At the tops of the lift engine cells 19 are upward and outward opening doors 22 which, when open, form an air intake channel 23 between themselves and the respective fuselage side. Beneath the cells 19 there are pairs of doors 24 which open downward to form extended channels 25 for the hot effluent gases. Within these channels high intensity mixing can occur between the gas effluent from each lift engine and cool bypass air that passes down through the sponson pod around and outside the engine casings. This augments the available thrust and reduces noise emission.

While in the arrangement illustrated, the main undercarriage bay doors 16 are inboard, it is possible to arrange matters so that these doors are outboard of the bays in which case they may form the inboard doors bounding the extended jet effluent mixing channels 25.

In addition to the lift engines 21 the airplane also has four propulsion engines 26 housed in pairs in two nacelles 27. These are tiltable into the vertical position shown at 29 such that on takeoff the thrust from the propulsion engines can be used for obtaining additional lift. The two pairs of propulsion engines are shown mounted one above each wing near the trailing edge.

However, the type and position of the propulsion engines employed is not essential to the design of airplane proposed. The propulsion engines could well be housed beneath the wing and probably somewhat forward of the leading edge. They may be arranged to tilt or alternatively one of the known forms of thrust deflection can be employed. However, it will be appreciated that if the location of the propulsion engines is varied in a fore and aft direction the location of the pure lift engines will also have to be rearranged such that the airplane is appropriately balanced during hovering flight. With the arrangement according to the invention this can be conveniently carried out, the sponson pods at the side of the fuselage being extended or shortened at their forward or aft ends as required.

FIGS. 4, 5 and 6 illustrate such an alternative design, in which the propulsion engines 30 are carried well forward beneath the wings, and the cellular sponson pods 31 are much elongated.

I claim:

1. A V/STO1 aircraft comprising: a fuselage, a fin and a tailplane mounted on the aft end of the fuselage, wings on either side of the fuselage forward of the fin and tailplane, two sponson pods disposed on opposite sides of the fuselage and having portions forward of the wings and portions lying intermediate the wings and the fuselage, each of which sponson pods extends for its whole length contiguously alongside the fuselage parallel thereto, a fore-and-aft series of laterally extending spars that are integral with the fuselage structure and are equidistantly spaced from one another in the fore-and-aft direction which spars project out beyond the fuselage sides into said sponson pods where they divide up the space within each sponson pod into a fore-and-aft row of substantially equal sized consecutive compartments to contain lifting power units a plurality of which compartments are situated in the portion of the sponson pod between the fuselage and the respective wing and a further plurality of which compartments are situated in the portion of the sponson pod forward of the wing, two fore-and-aft rows of lifting power units to provide direct lifting thrust the lifting power units in each row being equidistantly spaced in the fore-and-aft direction and disposed with their axes substantially vertical in the individual compartments of the pod between the spars, air intake doors along the tops of the sponson pods arranged for opening upwardly to admit air for the lifting power units, and efflux outlet doors along the undersides of the sponson pods arranged for opening downwardly to permit outflow of the lifting power unit effluxes, and wherein of said spars in the series that divide up the sponson pods into said individual compartments, those spars that lie forward of the wings terminate at the outboard walls of the sponson pods, while a plurality of said spars that enter the portions of the pods intermediate the wings and the fuselage, and have lifting power units disposed between them, constitute cranked wing spars that extend outward beyond the sponson pods and through the wings, these cranked wing spars serving to transmit to the fuselage both the structural loads due to wing lift and a due proportional of the upward thrust loads of the lifting power units without any spars crossing individual ones of said compartments.

2. An aircraft according to claim 1, wherein said sponson pods also extend aft of the wings where they contain further compartments for lifting power units.

3. An aircraft according to claim 1, having, in addition to the power units within the sponson pods, gas turbojet power units for forward propulsion mounted above the wings and adjacent the trailing edges thereof, in an arrangement such that the jet effluxes of the forward propulsion units can, at least in part, be directed downward at will behind the wings to give added lift.

4. An aircraft according to claim 1, wherein said power units are gas turbojet lift engines.

5. An aircraft according to claim 4, wherein the sponson pods are situated alongside the lower part of the fuselage, and air intake channels for the lift engines are each bounded on one side by said upward opening doors and on the other side by the wall of the fuselage itself.

6. An aircraft according to claim 4, wherein said downward opening doors beneath the sponson pods form engine effluent exit channels of sufficient length for high intensity mixing with a cool airflow to occur therein to achieve thrust augmentation and reduce gas velocity.

7. An aircraft according to claim 6, wherein a main undercarriage retracts into bays in the underside of the fuselage and these bays have fore-and-aft hinged doors which, when lowered, form at least part of inboard walls of said engine effluent exit channels.